(12) United States Patent
Harris et al.

(10) Patent No.: US 9,485,318 B1
(45) Date of Patent: Nov. 1, 2016

(54) SYSTEM AND METHOD FOR IDENTIFYING INFLUENTIAL SOCIAL MEDIA AND PROVIDING LOCATION-BASED ALERTS

(71) Applicant: GEOFEEDIA, INC., Chicago, IL (US)

(72) Inventors: Philip Harris, Naples, FL (US); Scott Mitchell, Naples, FL (US); Michael Mulroy, Golf, IL (US)

(73) Assignee: Geofeedia, Inc., Chicago, IL (US)

( * ) Notice: Subject to any disclaimer, the term of this patent is extended or adjusted under 35 U.S.C. 154(b) by 0 days.

(21) Appl. No.: 14/813,039

(22) Filed: Jul. 29, 2015

(51) Int. Cl.
G06F 15/173 (2006.01)
H04L 29/08 (2006.01)
H04L 12/58 (2006.01)

(52) U.S. Cl.
CPC ............ *H04L 67/22* (2013.01); *H04L 51/32* (2013.01); *H04L 67/18* (2013.01)

(58) Field of Classification Search
CPC ............ G06Q 30/0261; H04L 51/20; H04L 12/1845; H04L 12/1895
USPC ...................................................... 709/224
See application file for complete search history.

(56) References Cited

U.S. PATENT DOCUMENTS

| | | | |
|---|---|---|---|
| 6,026,368 A | 2/2000 | Brown | |
| 6,363,320 B1 | 3/2002 | Chou | |
| 6,591,266 B1 | 7/2003 | Li | |
| 7,522,940 B2 | 4/2009 | Jendbro | |
| 7,680,796 B2 | 3/2010 | Yeh | |
| 7,698,336 B2 | 4/2010 | Nath | |
| 7,912,451 B2 | 3/2011 | Eckhart | |
| 7,974,983 B2 * | 7/2011 | Goeldi | G06Q 10/00 707/628 |
| 8,103,741 B2 | 1/2012 | Frazier | |
| 8,341,223 B1 | 12/2012 | Patton | |
| 8,428,228 B1 | 4/2013 | Baxter, Jr. | |
| 8,484,224 B1 | 7/2013 | Harris | |

(Continued)

FOREIGN PATENT DOCUMENTS

| | | |
|---|---|---|
| EP | 1045345 A1 | 10/2000 |
| EP | 2187594 A1 | 5/2010 |

(Continued)

OTHER PUBLICATIONS

Amitay et al., "Web-a-Where: Geotaqqinq Web Content", Proceedings of the 27th Annual International ACM SIGIR Conference on Research and Development in Information Retrieval (SIGIR), 2004, pp. 273-280.

(Continued)

*Primary Examiner* — Phuoc Nguyen
(74) *Attorney, Agent, or Firm* — Sheppard Mullin Richter & Hampton LLP

(57) ABSTRACT

The invention relates to systems and methods of identifying social media influencers and providing location-based alerts based on social media content items posted to social media providers from monitored locations. The system may identify a user who visited a specified location based on a social media content item posted by the user from the specified location. The system may provide an alert to an entity such as a retailer whenever the user re-posts from the specified location. The system may further determine whether, to what extent, and identity of users over whom the user has influence based on one or more influence factors. An influencer is a user who is determined to have influenced the behavior of other users, as determined from the user's social media activity and/or the influenced users' social media activity.

22 Claims, 6 Drawing Sheets

(56) References Cited

U.S. PATENT DOCUMENTS

| | | |
|---|---|---|
| 8,595,317 B1 | 11/2013 | Harris |
| 8,612,533 B1 | 12/2013 | Harris |
| 8,639,767 B1 | 1/2014 | Harris |
| 8,655,873 B2 | 2/2014 | Mitchell |
| 8,655,983 B1 | 2/2014 | Harris |
| 8,812,951 B1 | 8/2014 | White |
| 8,843,515 B2 | 9/2014 | Burris |
| 8,849,935 B1 | 9/2014 | Harris |
| 8,850,531 B1 | 9/2014 | Harris |
| 8,862,589 B2 | 10/2014 | Harris |
| 8,990,346 B2 | 3/2015 | Harris |
| 9,055,074 B2 | 6/2015 | Harris |
| 9,077,675 B2 | 7/2015 | Harris |
| 9,077,782 B2 | 7/2015 | Harris |
| 9,258,373 B2 | 2/2016 | Harris |
| 9,307,353 B2 | 4/2016 | Harris |
| 9,317,600 B2 | 4/2016 | Harris |
| 9,369,533 B2 | 6/2016 | Harris |
| 9,436,690 B2 | 9/2016 | Harris |
| 9,443,090 B2 | 9/2016 | Harris |
| 2002/0029226 A1 | 3/2002 | Li |
| 2002/0029384 A1 | 3/2002 | Griggs |
| 2002/0116505 A1 | 8/2002 | Higgins |
| 2002/0128908 A1 | 9/2002 | Levin |
| 2002/0188669 A1 | 12/2002 | Levine |
| 2003/0018607 A1 | 1/2003 | Lennon |
| 2003/0025832 A1 | 2/2003 | Swart |
| 2003/0040971 A1 | 2/2003 | Freedenberg |
| 2003/0088609 A1 | 5/2003 | Guedalia |
| 2004/0203854 A1 | 10/2004 | Nowak |
| 2004/0205585 A1 | 10/2004 | McConnell |
| 2004/0225635 A1 | 11/2004 | Toyama |
| 2005/0034074 A1 | 2/2005 | Munson |
| 2006/0002317 A1 | 1/2006 | Venkata |
| 2006/0106778 A1 | 5/2006 | Baldwin |
| 2006/0184968 A1 | 8/2006 | Clayton |
| 2006/0200305 A1 | 9/2006 | Sheha |
| 2007/0043721 A1 | 2/2007 | Ghemawat |
| 2007/0112729 A1 | 5/2007 | Wiseman |
| 2007/0121843 A1 | 5/2007 | Atazky |
| 2007/0143345 A1 | 6/2007 | Jones |
| 2007/0210937 A1 | 9/2007 | Smith |
| 2007/0276919 A1 | 11/2007 | Buchmann |
| 2007/0294299 A1 | 12/2007 | Goldstein |
| 2008/0092054 A1 | 4/2008 | Bhumkar |
| 2008/0104019 A1 | 5/2008 | Nath |
| 2008/0125969 A1 | 5/2008 | Chen |
| 2008/0147674 A1 | 6/2008 | Nandiwada |
| 2008/0162540 A1 | 7/2008 | Parikh |
| 2008/0189099 A1 | 8/2008 | Friedman |
| 2008/0192934 A1 | 8/2008 | Nelger |
| 2008/0250031 A1 | 10/2008 | Ting |
| 2008/0294603 A1 | 11/2008 | Ranjan |
| 2009/0005968 A1 | 1/2009 | Vengroff |
| 2009/0102859 A1 | 4/2009 | Athsani |
| 2009/0132435 A1 | 5/2009 | Titus |
| 2009/0138497 A1 | 5/2009 | Zavoli |
| 2009/0210426 A1 | 8/2009 | Kulakov |
| 2009/0217232 A1 | 8/2009 | Beerel |
| 2009/0222482 A1 | 9/2009 | Klassen |
| 2009/0297118 A1 | 12/2009 | Fink |
| 2009/0300528 A1 | 12/2009 | Stambaugh |
| 2009/0327232 A1 | 12/2009 | Carter |
| 2010/0007941 A1 | 1/2010 | Dasgupta |
| 2010/0030648 A1 | 2/2010 | Manolescu |
| 2010/0076968 A1 | 3/2010 | Boyns |
| 2010/0079338 A1 | 4/2010 | Wooden |
| 2010/0083124 A1 | 4/2010 | Druzgalski |
| 2010/0145947 A1 | 6/2010 | Kolman |
| 2010/0149399 A1 | 6/2010 | Mukai |
| 2010/0153386 A1 | 6/2010 | Tysowski |
| 2010/0153410 A1 | 6/2010 | Jin |
| 2010/0174998 A1 | 7/2010 | Lazarus |
| 2010/0177120 A1 | 7/2010 | Balfour |
| 2010/0180001 A1 | 7/2010 | Hardt |
| 2011/0007941 A1 | 1/2011 | Chen |
| 2011/0010674 A1 | 1/2011 | Knize |
| 2011/0035284 A1 | 2/2011 | Moshfeghi |
| 2011/0040894 A1 | 2/2011 | Shrum, Jr. |
| 2011/0055176 A1 | 3/2011 | Choi |
| 2011/0072106 A1 | 3/2011 | Hoffert |
| 2011/0072114 A1 | 3/2011 | Hoffert |
| 2011/0078584 A1 | 3/2011 | Winterstein |
| 2011/0083013 A1 | 4/2011 | Nice |
| 2011/0113096 A1 | 5/2011 | Long |
| 2011/0123066 A9 | 5/2011 | Chen |
| 2011/0131496 A1 | 6/2011 | Abram |
| 2011/0137561 A1 | 6/2011 | Kankainen |
| 2011/0142347 A1 | 6/2011 | Chen |
| 2011/0153368 A1 | 6/2011 | Pierre |
| 2011/0202544 A1 | 8/2011 | Carle |
| 2011/0227699 A1 | 9/2011 | Seth |
| 2011/0270940 A1 | 11/2011 | Johnson |
| 2011/0288917 A1 | 11/2011 | Wanek |
| 2011/0307307 A1 | 12/2011 | Benmbarek |
| 2012/0001938 A1 | 1/2012 | Sandberg |
| 2012/0047219 A1 | 2/2012 | Feng |
| 2012/0077521 A1 | 3/2012 | Boldyrev |
| 2012/0078503 A1 | 3/2012 | Dzubay |
| 2012/0084323 A1 | 4/2012 | Epshtein |
| 2012/0101880 A1 | 4/2012 | Alexander |
| 2012/0124161 A1 | 5/2012 | Tidwell |
| 2012/0150901 A1 | 6/2012 | Johnson |
| 2012/0158536 A1 | 6/2012 | Gratton |
| 2012/0166367 A1 | 6/2012 | Murdock |
| 2012/0212398 A1 | 8/2012 | Border |
| 2012/0221687 A1 | 8/2012 | Hunter |
| 2012/0232939 A1 | 9/2012 | Pierre |
| 2012/0233158 A1 | 9/2012 | Braginsky |
| 2012/0239763 A1* | 9/2012 | Musil .............. G06Q 50/01 709/206 |
| 2012/0254774 A1 | 10/2012 | Patton |
| 2012/0259791 A1 | 10/2012 | Zoidze |
| 2012/0276848 A1 | 11/2012 | Krattiger |
| 2012/0276918 A1 | 11/2012 | Krattiger |
| 2012/0323687 A1 | 12/2012 | Schuster |
| 2012/0330959 A1 | 12/2012 | Kretz |
| 2013/0013713 A1 | 1/2013 | Shoham |
| 2013/0018957 A1 | 1/2013 | Parnaby |
| 2013/0051611 A1 | 2/2013 | Hicks |
| 2013/0054672 A1 | 2/2013 | Stilling |
| 2013/0060796 A1 | 3/2013 | Gilg |
| 2013/0073388 A1 | 3/2013 | Heath |
| 2013/0073389 A1 | 3/2013 | Heath |
| 2013/0073631 A1 | 3/2013 | Patton |
| 2013/0110631 A1 | 5/2013 | Mitchell |
| 2013/0110641 A1 | 5/2013 | Ormont |
| 2013/0124437 A1 | 5/2013 | Pennacchiotti |
| 2013/0131918 A1 | 5/2013 | Hahne |
| 2013/0132194 A1 | 5/2013 | Rajaram |
| 2013/0150015 A1 | 6/2013 | Valko |
| 2013/0159463 A1 | 6/2013 | Bentley |
| 2013/0201182 A1 | 8/2013 | Kuroki |
| 2013/0238599 A1 | 9/2013 | Burris |
| 2013/0238652 A1 | 9/2013 | Burris |
| 2013/0238658 A1 | 9/2013 | Burris |
| 2013/0268558 A1 | 10/2013 | Burris |
| 2013/0290554 A1 | 10/2013 | Chen |
| 2013/0325964 A1 | 12/2013 | Berberat |
| 2013/0346563 A1 | 12/2013 | Huang |
| 2014/0025911 A1 | 1/2014 | Sims |
| 2014/0040371 A1* | 2/2014 | Gurevich .............. H04L 61/609 709/204 |
| 2014/0089296 A1 | 3/2014 | Burris |
| 2014/0089343 A1 | 3/2014 | Burris |
| 2014/0089461 A1 | 3/2014 | Harris |
| 2014/0095509 A1 | 4/2014 | Patton |
| 2014/0164368 A1 | 6/2014 | Mitchell |
| 2014/0195918 A1 | 7/2014 | Friedlander |
| 2014/0207893 A1 | 7/2014 | Harris |
| 2014/0222950 A1 | 8/2014 | Rabel |
| 2014/0236882 A1 | 8/2014 | Rishe |
| 2014/0256355 A1 | 9/2014 | Harris |
| 2014/0258451 A1 | 9/2014 | Harris |

(56) References Cited

U.S. PATENT DOCUMENTS

| | | | |
|---|---|---|---|
| 2014/0259113 A1 | 9/2014 | Harris | |
| 2014/0274148 A1 | 9/2014 | Harris | |
| 2014/0280103 A1 | 9/2014 | Harris | |
| 2014/0280278 A1 | 9/2014 | Harris | |
| 2014/0280569 A1 | 9/2014 | Harris | |
| 2014/0297740 A1* | 10/2014 | Narayanan | H04L 67/306 709/204 |
| 2015/0019648 A1 | 1/2015 | Harris | |
| 2015/0019866 A1 | 1/2015 | Braness | |
| 2015/0020208 A1 | 1/2015 | Harris | |
| 2015/0032739 A1 | 1/2015 | Harris | |
| 2015/0172396 A1* | 6/2015 | Longo | H04L 67/18 709/204 |
| 2015/0256632 A1 | 9/2015 | Harris | |
| 2015/0381380 A1 | 12/2015 | Harris | |
| 2016/0006783 A1 | 1/2016 | Harris | |
| 2016/0014219 A1 | 1/2016 | Harris | |
| 2016/0182656 A1 | 6/2016 | Harris | |
| 2016/0219403 A1 | 7/2016 | Harris | |
| 2016/0232182 A1 | 8/2016 | Harris | |

FOREIGN PATENT DOCUMENTS

| | | |
|---|---|---|
| EP | 2293566 A2 | 3/2011 |
| WO | 9915995 A1 | 4/1999 |
| WO | 2010049918 A1 | 5/2010 |
| WO | 2013133870 A2 | 9/2013 |
| WO | 2013134451 A1 | 9/2013 |

OTHER PUBLICATIONS

Bao, Jie, et al.. "GeoFeed: A Location-Aware News Feed System", IEEE Xplore Digital Library, Published in 2012 IEEE 28th International Conference on Data Engineering, Apr. 1-5, 2012, 14 pages.

Chow et al., "Towards Location-Based Social Networking Services", LBSN 2010 Proceedings of the 2nd ACM SIGSPATIAL International Workshop on Location Based Social Networks, Nov. 2, 2010, pp. 31-38.

Lee et al., "Tag-Geotag Correlation in Social Networks", Proceedings of the 2008 ACM Workshop on Search in Social Media, 2008, pp. 59-66.

Sarwat, Mohamed, et al., "Sindbad: A Location-Based Social Networking System", SIGMOD '12, Scottsdale, Arizona, May 20-24, 2012, 4 pages.

U.S. Appl. No. 14/500,881, a non-final Office Action issued, mailed Sep. 21, 2015, 5 pages.

U.S. Appl. No. 13/284,455, a non-final Office Action issued, mailed Jan. 7, 2013, 18 pages.

U.S. Appl. No. 13/284,455, a non-final Office Action issued, mailed Jun. 4, 2013, 28 pages.

U.S. Appl. No. 13/284,455, a Notice of Allowance issued, mailed Oct. 4, 2013, 17 pages.

U.S. Appl. No. 13/619,888, a non-final Office Action issued, mailed Mar. 1, 2013, 15 pages.

U.S. Appl. No. 13/619,888, a Notice of Allowance issued, mailed Jul. 9, 2013, 10 pages.

U.S. Appl. No. 13/708,404, a Notice of Allowance issued, mailed May 24, 2013, 12 pages.

U.S. Appl. No. 13/708,466, a non-final Office Action issued, mailed Apr. 17, 2013, 15 pages.

U.S. Appl. No. 13/708,466, a Notice of Allowance issued, mailed Sep. 3, 2013, 11 pages.

U.S. Appl. No. 13/708,516, a non-final Office Action issued, mailed May 15, 2013, 11 pages.

U.S. Appl. No. 13/708,516, a Notice of Allowance issued, mailed Jun. 7, 2013, 14 pages.

U.S. Appl. No. 13/788,760, a Notice of Allowance issued, mailed Jul. 26, 2013, 12 pages.

U.S. Appl. No. 13/788,843, a final Office Action issued, mailed Jan. 21, 2014, 25 pages.

U.S. Appl. No. 13/788,843, a non-final Office Action issued, mailed Aug. 5, 2013, 17 pages.

U.S. Appl. No. 13/788,843, a non-final Office Action issued, mailed Feb. 20, 2015, 26 pages.

U.S. Appl. No. 13/788,909, a non-final Office Action issued, mailed Aug. 12, 2013, 17 pages.

U.S. Appl. No. 13/788,909, a Notice of Allowance issued, mailed Jan. 24, 2014, 12 pages.

U.S. Appl. No. 13/788,909, a Notice of Allowance issued, mailed Jun. 24, 2014, 11 pages.

U.S. Appl. No. 13/843,832, a non-final Office Action issued, mailed Sep. 13, 2013, 12 pages.

U.S. Appl. No. 13/843,832, a Notice of Allowance issued, mailed Jan. 24, 2014, 6 pages.

U.S. Appl. No. 13/843,832, a Notice of Allowance issued, mailed May 20, 2014, 7 pages.

U.S. Appl. No. 13/843,949, a non-final Office Action issued, mailed Aug. 29, 2013, 12 pages.

U.S. Appl. No. 13/843,949, a Notice of Allowance issued, mailed Feb. 3, 2014, 11 pages.

U.S. Appl. No. 13/843,949, a Notice of Allowance issued, mailed May 9, 2014, 10 pages.

U.S. Appl. No. 14/089,631, a final Office Action issued, mailed Jan. 2, 2015, 8 pages.

U.S. Appl. No. 14/089,631, a non-final Office Action issued, mailed Jul. 8, 2014, 21 pages.

U.S. Appl. No. 14/089,631, a Notice of Allowance issued, mailed Feb. 2, 2015, 10 pages.

U.S. Appl. No. 14/108,301, a non-final Office Action issued, mailed Sep. 11, 2014, 10 pages.

U.S. Appl. No. 14/108,301, a Notice of Allowance issued, mailed Feb. 20, 2015, 13 pages.

U.S. Appl. No. 14/164,362, a non-final Office Action issued, mailed Oct. 23, 2014, 15 pages.

U.S. Appl. No. 14/164,362, a Notice of Allowance issued, mailed Feb. 24, 2015, 22 pages.

U.S. Appl. No. 14/180,473, a final Office Action issued, mailed Jan. 5, 2015, 7 pages.

U.S. Appl. No. 14/180,473, a non-final Office Action issued, mailed Jul. 8, 2014, 18 pages.

U.S. Appl. No. 14/180,473, a Notice of Allowance issued, mailed Jan. 27, 2015, 8 pages.

U.S. Appl. No. 14/180,845, a final Office Action issued, mailed Feb. 25, 2015, 32 pages.

U.S. Appl. No. 14/180,845, a non-final Office Action issued, mailed Aug. 27, 2015, 43 pages.

U.S. Appl. No. 14/180,845, a non-final Office Action issued, mailed Oct. 23, 2014, 32 pages.

U.S. Appl. No. 14/215,612, a final Office Action issued, mailed Nov. 28, 2014, 31 pages.

U.S. Appl. No. 14/215,612, a non-final Office Action issued, mailed Jul. 11, 2014, 16 pages.

U.S. Appl. No. 14/215,612, a non-final Office Action issued, mailed Aug. 18, 2015, 27 pages.

U.S. Appl. No. 14/500,832, a non-final Office Action issued, mailed May 21, 2015, 13 pages.

U.S. Appl. No. 14/512,293, a final Office Action issued, mailed Aug. 14, 2015, 15 pages.

U.S. Appl. No. 14/512,293, a non-final Office Action issued, mailed Jan. 28, 2015, 18 pages.

U.S. Appl. No. 14/666,056, a non-final Office Action issued, mailed Aug. 10, 2015, 17 pages.

U.S. Appl. No. 13/788,843, a Notice of Allowance issued, mailed Dec. 3, 2015, 18 pages.

U.S. Appl. No. 14/500,881, a non-final Office Action issued, mailed Dec. 21, 2015, 24 pages.

U.S. Appl. No. 14/512,293, a non-final Office Action issued, mailed Dec. 9, 2015, 14 pages.

U.S. Appl. No. 14/666,056, a Final Office Action issued, mailed Jan. 4, 2016, 11 pages.

U.S. Appl. No. 14/813,031, a non-final Office Action issued, mailed Nov. 24, 2015, 23 pages.

(56) References Cited

OTHER PUBLICATIONS

U.S. Appl. No. 14/180,845, a final Office Action issued, mailed Feb. 22, 2016, 43 pages.
U.S. Appl. No. 14/512,293, a Final Office Action issued, mailed Apr. 6, 2016, 9 pages.
U.S. Appl. No. 14/733,715, a non-final Office Action issued, mailed Mar. 11, 2016, 25 pages.
U.S. Appl. No. 14/792,538, a non-final Office Action issued, mailed Feb. 26, 2016, 20 pages.
U.S. Appl. No. 14/813,031, a final Office Action issued, mailed Mar. 21, 2016, 41 pages.
U.S. Appl. No. 14/180,845, a non-final Office Action, mailed Jul. 7, 2016, 51 pages.
U.S. Appl. No. 14/733,715, a Final Office Action, mailed Aug. 17, 2016, 21 pages.
U.S. Appl. No. 14/813,031, a non-final Office Action, mailed Aug. 5, 2016, 46 pages.
U.S. Appl. No. 15/018,767, a non-final Office Action, mailed Jun. 6, 2016, 19 pages.
U.S. Appl. No. 15/130,289, a non-final Office Action, mailed Aug. 10, 2016, 42 pages.

* cited by examiner

SYSTEM AND METHOD FOR IDENTIFYING INFLUENTIAL SOCIAL MEDIA AND PROVIDING LOCATION-BASED ALERTS

FIELD OF THE INVENTION

The invention relates to systems and methods of identifying influential social media users and providing location-based alerts based on social media content items posted to social media providers from monitored locations.

BACKGROUND OF THE INVENTION

Retailers, event managers, professional sports teams, public safety agencies, and others may have difficulty identifying and then analyzing influential social media. Influential social media may be important to the reviewer based on the audience reach of a post, the location of the post, the hometown of the user that originated the post, or the relevance of the post to a certain criminal or civil investigation. For example, it may be difficult for retailers to identify its customers without asking them to fill out unwanted surveys or asking them to connect with the retailer directly via social media providers (e.g., following the retailer on FACEBOOK, TWITTER, etc.). It may be further difficult to understand what may be of interest to their customers, apart from purchases made at the retailer, or determine other behaviors that may indicate their customers' interests. For law enforcement agencies, it may be difficult to identify suspects or potential suspects and their associations and behavior.

These and other drawbacks exist.

SUMMARY OF THE INVENTION

The invention addressing these and other drawbacks relates to systems and methods of identifying influential social media and providing location-based alerts based on social media content items posted to social media providers from monitored locations.

The system may monitor a specified location and identify influential social media posted from within the specified location. For example, the system may aggregate social media content items posted from the specified location, and identify a user who posted at least one of the aggregated social media content items.

The system may consider the user that posted the influential social media item a "social media influencer" (also referred to herein as "influencers" or "users of interest"). Then, the system may monitor the user and provide an alert to an entity when the user posts another social media content item from the specified location. In this manner, an entity such as a retailer may be alerted when its customers have been identified and are visiting its retail locations.

The system may determine the identity of users over whom the social media influencer has influence based on one or more factors. An influencer is a user who is determined to have the ability to influence the behavior of other users or may have the ability to reach many other users based on the number of followers or friends they have on a variety of social media networks. Retailers, consumer product companies, event managers, and others are interested in identifying influencers due to their ability to inexpensively reach a large group of people with a single Tweet™, Instagram™ photo, or Facebook™ post. For example, if a retailer is able to provide a positive experience to or solve a problem for an influencer, the influencer may, independently or through some compelling by the retailer, share their experience with their followers or friends. When this happens, the retailer amplifies the positive experience of one customer to potentially thousands or hundreds of thousands of people. The retailer is attracted to this method of spreading goodwill because of a) the genuine nature of the message because it came from a legitimate customer rather than a paid endorser or advertisement; and b) the low cost of distribution compared to traditional forms of advertising. Additionally, a user may be determined to influence the behavior of another user if the user posted a social media content item and another user acted on that social media content item.

Another influence factor may be ascribed through a subscription to a third-party service that analyzes a variety of social networks and other factors to determine whether or not a person is an influencer. Such systems (e.g. Klout™) can programmatically analyze multiple sources of information, including social networks and other systems, to determine an objective influence score that can be used by other systems to ascribe value to the individual.

Another influence factor may include a number of times that a user influences another user. A user may be determined to influence the behavior of another user if the user posted a social media content item related to a product or service and another user (e.g., a social media contact or friend) subsequently purchased the product or service (e.g., if purchase records from a retailer is made available to the system) and/or is determined to have subsequently visited a retail location that offers the product or service (e.g., as determined from a social media content item posted by that user from the retail location). In another example, a user may be determined to influence the behavior of another user if the user visits a given location and another user (e.g., a social media contact or friend) subsequently visits the given location, presumably because the user has influenced the other user to also visit the given location.

Another influence factor may include the influence factors of the users that follow a user. For example, if user Bob is followed by 1,000 users who have very little influence themselves and user Rick is followed by 10 users with very high influence, then the system may determine that Rick has very high influence relative to Bob, regardless of the fact that Rick has fewer followers.

In an implementation, the system may determine a level of influence that a user has over other users. For example, the system may count the number of times that the user has influenced the behavior of other users (e.g., a number of users that purchased a product or service that the user has TWEETED about). The system may also (or instead) determine the number of followers a user has or otherwise determine influence by the number of times a person's social media posts are acted upon (liked, favorited, shared, retweeted, etc.) by others in the network. In this manner, the system may determine not only whether a given user influences others, but a level of influence that a user has over other users.

In an implementation, the system may likewise determine whether a user is influenced by other users and a level in which the user is influenced by others. In this manner, the system may characterize a given user as being an influencer (and the level of influence the user has) and/or being an influenced user (and the level in which the user is influenced).

In an implementation, the system may take into account other influence factors as well, such as, without limitation, a number of social media contacts/friends, a number of re-posts (e.g., RETWEETS), a number of comments left by other users on a social media account of the user, and/or other influence factors that may indicate a level of influence by the user.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
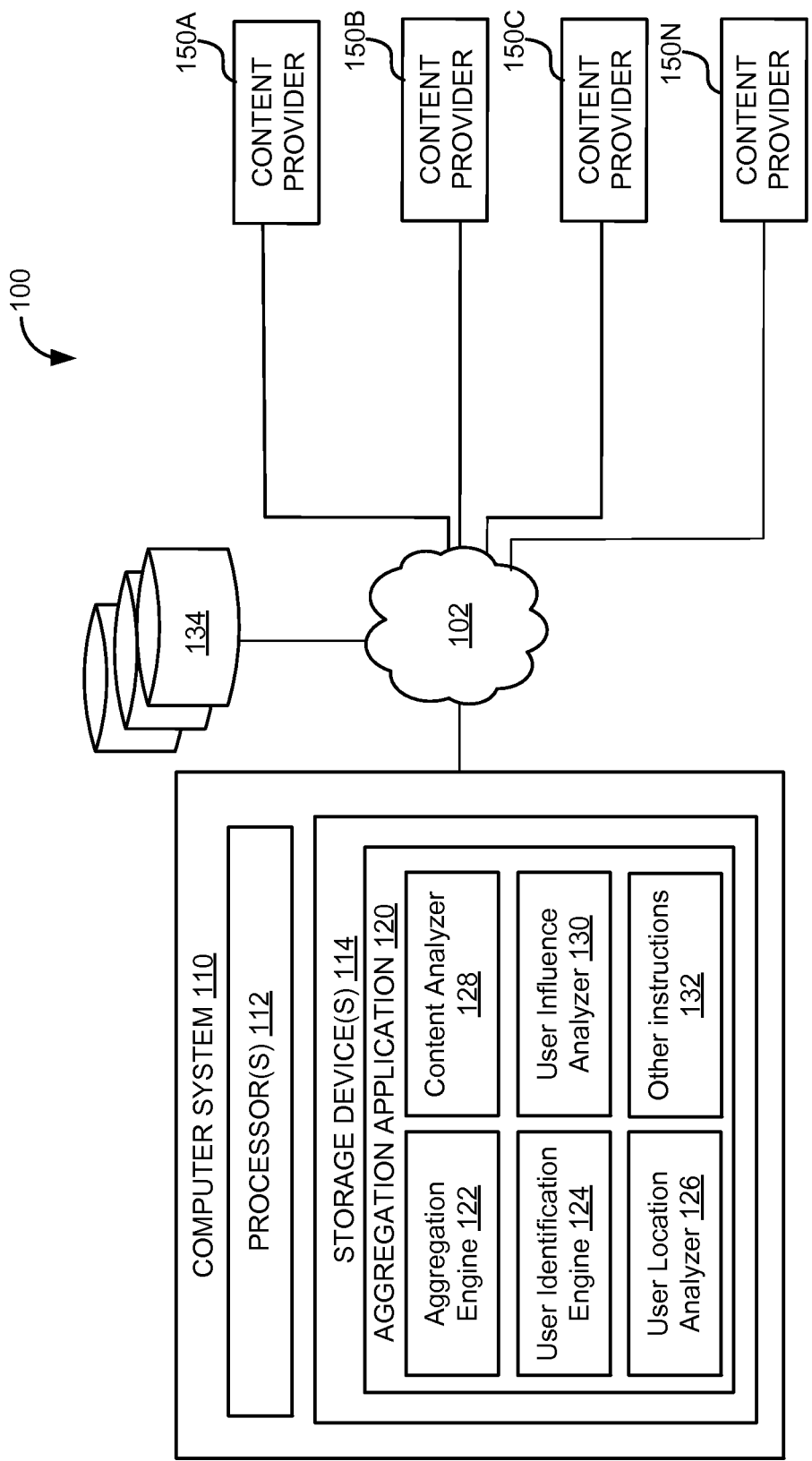
FIG. 1 illustrates a system of analyzing social media users, including their locations visited and behavioral information, based on social media content items posted from monitored locations, according to an implementation of the invention.

FIG. 1 illustrates a system 100 of analyzing social media users, including their locations visited and behavioral information, based on social media content items posted from monitored locations, according to an implementation of the invention. The system may monitor a specified location and identify a user of interest who posts a social media content item from or in association with the specified location. For example, the system may aggregate social media content items posted from the specified location, and identify a user who posted at least one of the aggregated social media content items.

Once the system identifies a user of interest, the system may aggregate other social media content items posted by the user of interest (e.g., from different locations and/or at different times). The system may perform a user analysis using all or a portion of the other social media content items.

The user analysis may include an analysis of locations visited by the user of interest. For instance, the system may identify locations visited by the user of interest using locations associated with the other social media content items (e.g., metadata indicating GPS coordinates, social media location profile information, etc.). The locations visited may be used by the system to determine a location behavior of the user of interest. A location behavior may include a characteristic of a user defined by locations that the user has visited. For example, a location behavior may include travel routes taken by the user, patterns of travel, favorite locations of the user (e.g., a frequently visited restaurant or store), primary locations of the user (e.g., a home, work, or other primary location), and/or other characteristic of the user determined from locations visited by the user.

The user analysis may include an analysis of the content of the other social media content items. For instance, the system may parse text, perform image recognition, and/or analyze the content in other ways to determine interests of the user.

The user analysis may include an analysis of whether, to what extent, and identity of users over whom the user has influence. A user of interest may influence another user if the other user visits a location previously visited by the user of interest (as determined from social media content items and/or other location information obtained by the system), posts content similar to content posted by the user of interest, reposts content posted by the other user of interest, makes a purchase related to content posted by the user of interest (e.g., if purchase information is shared by retailers with the system), and/or performs other actions that indicate the other user was influenced by the user of interest.

The system may determine one or more characteristics of the user based on the user analysis. In this manner, a user of interest may be identified based on a social media content item posted from a monitored location and then characterized based on social media content items posted before and/or after the social media content item was posted from the monitored location. The system may build, update, and maintain a user profile that includes the characteristics of the user. In this manner, users of interests may be monitored and characterized.

The system may be used in various ways and contexts. For a retailer, a user of interest may include a customer (including a potential customer) who posts a social media content item from its retail locations. The retailer may gain a greater understanding of their customers' interests and behaviors so that customized promotional strategies may be developed based on social media analysis. Additionally, a customer that influences other users may be a prime candidate with which to engage and collaborate on promotions and other marketing strategies. For example, a retailer may provide special promotions and incentives to its influential customers, in the hope that the influential customers will influence others to make purchases from the retailer. Alternatively or additionally, a retailer may use the system to monitor competitor's customers as well.

For marketers generally, a user of interest may include an event participant such as a user who attends a Major League Baseball (MLB) game. In this manner, users who attend MLB games (as determined from social media posts made from MLB baseball stadiums) may be identified. Targeted advertising campaigns may then be performed on the event participants. We could also develop a list for all people who posted from all United States airports over a certain time. Brand marketers may therefore develop highly relevant marketing campaigns based upon lists of social media users who were at a certain place in time and exhibited certain location-centric behavior.

For a public safety agency, a user of interest may include a suspect who posts a social media content item from a hotspot of criminal activity (e.g., a location in which crime is known or suspected to be prevalent). The law enforcement agency may gain a greater understanding of the suspect's movement patterns and associations with others. For instance, locations visited by the suspect may correlate with further criminal activity and/or other criminal hotspots. Suspects that influence others may be deemed to be higher ranking or otherwise be potentially an influential criminal.

Various examples of retailers using the system to understand their customers will be used throughout the disclosure. However, other implementations may be used as well. Having described a high level overview of some of the system functions and uses, attention will now be turned to various system components that facilitate these and other functions and uses. System 100 may include one or more computer systems 110, one or more databases 134, one or more content providers 150, and/or other components.

Computer System 110

Computer system 110 may include one or more processors 112 (also interchangeably referred to herein as processors 112, processor(s) 112, or processor 112 for convenience), one or more storage devices 114 (which may store a social media user analysis application 120), and/or other components. Processors 112 may be programmed by one or more computer program instructions. For example, processors 112 may be programmed by social media user analysis application 120 and/or other instructions.

Social media user analysis application 120 may include one or more sets of instructions such as, without limitation, a social media aggregator 122, a user identification engine 124, a user location analyzer 126, a content analyzer 128, a user behavior analyzer 130, and/or other instructions 132 that program computer system 110 to perform various operations, which are described below. As used herein, for convenience, the various instructions will be described as performing an operation, when, in fact, the various instructions program the processors 112 (and therefore computer system 110) to perform the operation.

In an implementation, social media aggregator 122 may obtain one or more content parameters that specify criteria used to filter in and/or out social media content items. Content parameters may include, without limitation, an indication of one or more geo-locations associated with a social media content item (e.g., a location from which a social media content item was created or posted), an identification of a user that created or posted a social media content item, a keyword included within or associated with a social media content item, a date/time (e.g., a date and/or time) that a social media content item was posted, an identification of a social media content provider 150 through which a social media content item was posted, a media format (e.g., video, photograph, text, etc.), and/or other parameter that can be used to filter in and/or out social media content items.

A social media content item may include content that is posted by a user to a social media content provider, generally to be provided to other users and usually in connection with a social media account of the user. A social media content item may include various forms of media, including, without limitation, a photograph, text, video, audio, and/or other forms of media.

For example, a retailer may wish to monitor social media content items that were created from one or more of its retail locations (and/or from different locations within a given retail location). Social media aggregator 122 may obtain an indication of one or more geo-locations corresponding to the retailer's retail location(s) and/or other content parameters and aggregate social media content items accordingly. In this manner, the retailer may identify social media content items that were posted from or in association with one or more of its retail locations. Such social media content items may represent social media posts by the retailer's customers.

In an implementation, social media aggregator 122 may obtain one or more social media content items from each of one or more social media content providers 150 based on at least one content parameter. A content parameter may be used to filter in and/or out certain content items. For example and without limitation, a content parameter may specify a location that is associated with a social media content item, a type of media (e.g., video, photo, etc.), a user who posted a social media content item, a social media content provider 150 through which a social media content item was posted, and/or other parameter that can be used to filter in and/or out social media content items. The social media content items may be aggregated from social media content providers 150 in various ways, including as described in U.S. Pat. No. 8,595,317, which is incorporated by reference herein in its entirety.

In an implementation, social media aggregator 122 may aggregate a set of social media content items that are relevant to one or more geo-locations by using a content parameter that specifies the one or more geo-locations. A social media content item may be relevant to a given geo-location if it was created from the geo-location (e.g., automatically or manually geo-tagged), describes the geo-location (e.g., conveys media such as a photograph or text related to the geo-location), is associated with a user whose social media profile indicates that the user is associated with the geo-location, and/or is otherwise associated with the geo-location.

Identifying Users of Interest Through Location-Based Analysis of Social Media

In an implementation, user identification engine 124 may identify a user of interest, which is a user that posted social media content item that is relevant to a set of one or more locations (i.e., are "relevant social media content item"). For example, user identification engine 124 may identify a retailer's customer who posted a social media content item from one or more of the retailer's locations, a potential criminal who posted a social media content item from a location known or suspected to be associated with criminal activity, and/or other users of interest. As such, a retailer, criminal investigators, and others may identify users who post social media content items from a given location without prior interaction with such users and/or without already being social media contacts with the users and then characterize the behavior of such users through their social media activity (e.g., social media content items they post or otherwise interact with).

In an implementation, user identification engine 124 may identify a given user that posted relevant social media content items only when the given user posted relevant social media content items a threshold number of times. For example, user identification engine 124 may identify a given user for further analysis only when the user has posted a relevant social media content item more than three times from a given geo-location. In this manner, a retailer may identify only those users who have visited its retail location a certain number of times (including one or more times).

Generating User Profiles Based on Social Media Content Items

Upon identification of a user that has posted social media content items relevant to the one or more locations, the system may analyze the user based on the user's use of social media to generate a user profile that indicates one or more characteristics of a user. A user profile may include, for example, a demographic, an interest, and/or other characteristic of the user. In this manner, retailers and others may gain a deeper understanding of their customers.

To generate a user profile, the system may analyze other locations that the user visits/has visited (e.g., based on locations from which the user posted social media content items), segment the user into a groups of users for classification purposes, determine whether the user is influential to other users, and/or perform other actions in relation to the user through an analysis of the user's use of social media.

To perform these and other analyses, the system may process the relevant social media content items that were already aggregated and/or aggregate and process other social media content items (e.g., social media content items that the user has posted in the past and other social media content items that the user continues to post), whether or not the other social media content items were posted from the one or more geo-locations.

Determining a User's Previous and Current Location Via Social Media Content Items In an implementation, user location analyzer 126 may obtain social media content items posted by the user in order to determine locations that the user has likely visited or is visiting based on location information associated with such social media content items. To do so, user location analyzer 126 may filter social media content items to include those that were posted by an identified user, but not filter based on location. In this manner, user location analyzer 126 may obtain social media content items posted by the user irrespective of a location associated with each item (and irrespective of whether such social media content items even includes location information).

User location analyzer 126 may determine whether location information is associated with a given social media content item posted by the user. For example, a social media content item may be associated with location information that indicates a location from which the social media content item was created or posted. If the social media content item is associated with such location information, user location analyzer 126 may determine that the user visited a location indicated by the location information.

The location information may include, without limitation, geo-tag information that is automatically associated with the social media content item (e.g., Exchangeable image file format ("Exif") data associated with a photograph), information manually input by the user, information from a social media profile of the user, a social media location "check-in," and/or other location information.

Different types of location information may be associated with different confidence levels. In other words, one type of location information may be more reliable than another type of location information at indicating a location at which a social media content item was created or posted. For example, Global Positioning System (GPS) information included in an Exif file may be more reliable than a user's social media profile information. In an implementation, user location analyzer 126 may take such confidence levels into account to determine a likelihood that a user was at a given location based on the location information and the confidence level. For example, user location analyzer 126 may determine a greater likelihood that a user was at a location using GPS information than a likelihood that the user was at a location using social media profile information.

User location analyzer 126 may analyze the locations where the user likely visited to determine one or more location behaviors of the user. A location behavior may include, without limitation, a history of locations visited, a pattern of locations visited (e.g., a route or direction of travel, order and number of stops in a given trip, etc.), retailers or types of places that the user visits, events that the user attends, and/or other information. [PersonMap]

In an implementation, a user profile may be generated or updated based on the location behavior of a user. For instance, a user that visits sporting goods stores may be associated with a certain demographic, an interest in exercising, and/or other characteristic. A user whose social media content items are posted from or around a given location may be determined to reside or work in the given location. For example, if a certain percentage (e.g., above a threshold percentage) or cluster of the user's social media content items are associated with a city, then the user may be determined to live and/or work in the city. In this manner, retailers and others may gain a greater understanding of their customers based on the locations that their customers visit, as determined from their social media posts. Additional examples of location analysis are illustrated and described with respect to FIG. 3.

The system may also analyze statistics related to the sequential geographic coordinates of a user's posts. For example, the system may analyze the distance between posts over a period of time to develop a "mobility score". The mobility score would help the system understand and compare the travel and location habits across multiple locations and/or events.

Analyzing the Content of a User's Social Media Content Items

In an implementation, content analyzer 128 may obtain and analyze the content of social media items posted by the user, which may indicate user interests. For instance, content analyzer 128 may analyze text within a social media content item (e.g., hashtags or other keywords), perform image recognition or other analysis on photographs or other images/media, crawl links within a social media content item, and/or perform other analysis on the content of a social media content item.

To analyze the text of a social media content item, content analyzer 128 may compare the text to a pre-stored dictionary. The pre-stored dictionary may associate a given word or set of words to user interests. For example, the words "football" and "basketball" may be associated with a user interest in sports. The words "exercise" and "run" may be associated with a user interest in sports. Other textual analysis, including context-based textual analysis, may be performed to determine user interests, as would be appreciated. In an implementation, a pre-stored dictionary may be customized by a given retailer or others. For example, a given retailer may include a name of one of its products or services and/or a name of one of its competitor's products or services as a keyword. In this manner, content analyzer 128 may determine when a user mentions a product or service of the retailer and/or of its competitor.

Content analyzer 128 may also analyze the accounts and/or handles followed by the user to determine their interests. For example, if the user follows @Nike, @RunnersWorld, and @NYCMarathon, the content analyzer 128 may, through and associative algorithm and database, determine that the user is interested in running and perhaps more broadly exercise.

To analyze the images of a social media content item, content analyzer 128 may perform image recognition on the images (e.g., photo or frame of a video) using an image recognition database. Objects recognized in an image may indicate user interests. For example, a photograph may include a recognized street corner (e.g., based on street sign recognition), which may indicate an interest in a business at that street corner. A video may include an image of a recognized museum, which may indicate an interest in subject matter housed in that museum. Furthermore, the image recognition database may be used to locate a user at a specific location and identify a specific logo in the photo (e.g. the Nike "swoosh") that is included in its database.

In an implementation, the image recognition database may be customized by a retailer or others. For example, a retailer may upload an image of its product or service (e.g., a service Mark) or that of its competitor so that if a user posts a photograph of the product or service (or competing product or service) the retailer may be made aware of such post.

In an implementation, a user profile may be generated or updated based on the content analysis. For example, the system may update a user profile based on the interest information determined from the content analysis. The user profile may be stored in a profile database, such as a database 134.

Determining Whether and to What Extent a User is an Influencer

In an implementation, user influence analyzer 130 may determine whether and to what extent a user is an influencer based on one or more influence factors. Social media influence is a marketing term that describes an individual's ability to affect other people's thinking in a social online community. The more influence a person has, the more appeal that individual has to companies or other individuals who want to promote an idea or sell a product. At its most basic level, influence can be estimated by examining a user's social media connections or associations, such as Twitter™ followers, Facebook™ friends, Instagram™ followers, LinkedIn™ connections, and so on. User influence analyzer 130 may further conduct a more thorough analysis to determine how a person makes social connections, the makeup of these connections, the level of trust between the person and their connections, and/or other information to determine a given user's influence or potential influence over others. In some cases, influence may be determined through the use of so-called "social influence measurement tools". For example, Klout™ provides a numerical score between 1 to 100 based on an individual's online activity on popular social networking sites such as Twitter™. It is expected that as it becomes easier to analyze and data mine unstructured data, the potential for more accurate social media influence metrics will improve. For the purposes of the system described herein, an influencer can be determined, through analysis of various data elements, to be capable of communicating with and potentially influencing a large number of people through immediate and broad distribution of a message. Among other things, the system may analyze the number of followers a user has, the number of retweets or "forwards" a users posts contain, the number of comments made on a user's posts, and/or other factors (e.g., social influence measurement tools).

In addition to the indirect definition of an influencer described above, an influencer can be described as someone who has influenced the behavior of other users in a more direct sense, as determined from the user's social media activity and/or the influenced users' social media activity. A user may be determined to influence the behavior of another user if the user posted a social media content item and another user acted on that social media content item.

A more direct influence factor may include a number of times that a user influences another user. A user may be determined to have directly influenced the behavior of another user if the user posted a social media content item related to a product or service and another user (e.g., a social media contact or friend) subsequently purchased the product or service (e.g., if purchase records from a retailer is made available to the system) and/or is determined to have subsequently visited a retail location that offers the product or service (e.g., as determined from a social media content item posted by that user from the retail location). In another example, a user may be determined to influence the behavior of another user if the user visits a given location and another user (e.g., a social media contact or friend) subsequently visits the given location, presumably because the user has influenced the other user to also visit the given location.

In an implementation, user influence analyzer 130 may determine a level of influence that a user has over other users. For example, user influence analyzer 130 may analyze follower counts, retweets/forwards, comments, and Klout scores, or in a more direct sense, count the number of times that the user has influenced the behavior of other users (e.g., a number of users that purchased a product or service that the user has TWEETED about). In this manner, user influence analyzer 130 may determine not only whether a given user influences others, but a level of influence that a user has over other users.

In an implementation, user influence analyzer 130 may likewise determine whether a user is influenced by other users and a level in which the user is influenced by others. In this manner, the system may characterize a given user as being an influencer (and the level of influence the user has) and/or being an influenced user (and the level in which the user is influenced).

In an implementation, a user profile may be generated or updated based on whether a user influences others, a level of influence that a user has over other users, whether a user is influenced by others, to what extent the user is influenced by others, and/or other information related to influence of users over other users.

Examples of Uses and Implementations of User Profiles

In an implementation, aggregation application 120 may identify relevant information for a user based on a user profile, which may include the location behavior, social media context, user influence, and/or other information determined from the user's social media activity.

Aggregation application 120 may determine relevant information for a user on behalf of the system (e.g., on behalf of an entity that operates the system), on behalf of a third party such as a retailer that uses the system to identify its customers, and/or others. The relevant information may include promotional information such as marketing materials, incentives such as coupons, directions, information related to a site such as museum information, and/or other relevant information that may interest the user. In this manner, aggregation application 120 may provide the user with relevant information based on the user having been identified as a user of interest (e.g., because the user posted social media content item from a given location) and based on a user profile as determined from a subsequent analysis of the user's social media activity.

For example, aggregation application 120 may identify relevant information based on a location behavior of a user. The location behavior may indicate an interest by the user and therefore may be leveraged to identify and provide relevant information. A retailer may provide its customer, for example, with an incentive if the user has visited a competitor or if they've visited another type or retailer or attended a certain type of event.

In another example, aggregation application 120 may identify relevant information based on an interest of a user as determined from an analysis of content of the user's social media content items. A retailer may use the system to provide, for example, incentives for sporting goods for users who are determined to have an interest in playing sports.

In yet another example, aggregation application 120 may identify relevant information based on whether a user influences other users (and/or the extent to which the user influences others). For instance, a user who is an influencer may be provided with marketing information that presumably would be used by the user to further market a product or service to others to whom the user may influence.

In an implementation, aggregation application 120 may provide relevant information in real-time. For example, when identified as a user of interest, the system may monitor the user's social media activity and provide relevant information in real-time when one or more triggering conditions have been met. Such triggering conditions may include entry within a geofence (as determined by a user posting a social media content item from within a geofenced location), posting a social media content item with a certain triggering keyword or image, and/or other triggering conditions. In an implementation, a retailer and others may specify the triggering conditions. In this manner, a retailer and others may use the system to identify its customers using social media and monitor its customer's social media activity to determine whether a given triggering condition has been met. The retailer and others may accordingly use the system to provide relevant information based on the monitored activity.

In an implementation, aggregation application 120 may segment users with other users according to their user profiles. For instance, users that tend to visit the same or similar locations (as determined from the social media content items they post) may be segmented together. Users that share similar interests as determined from a content analysis of social media content items may be segmented together. Likewise, users who are influencers (or tend to be influenced by others) may be segmented together. Relevant information may then be identified for segments of users.

In an implementation, aggregation application 120 may provide a user profile to retailers or others. For example, when a user has been identified as a user of interest and has been profiled based on the user's social media activity, the system may provide the user profile to a retailer so that the retailer may gain deeper insight into its customers.

Although illustrated in FIG. 1 as a single component, computer system 110 may include a plurality of individual components (e.g., computer devices) each programmed with at least some of the functions described herein. In this manner, some components of computer system 110 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIG. 1 as being co-located within a single processing unit, in implementations in which processor(s) 112 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1 and other drawing Figures, different numbers of entities than depicted may be used. Furthermore, according to various implementations, the components described herein may be implemented in hardware and/or software that configure hardware.

The various databases 132 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™, Microsoft SQLServer, Amazon Web Services, NoSQL solutions (e.g., HADOOP, HIVE, DYNAMO DB, etc.) or others may also be used, incorporated, or accessed. The database may comprise one or more such databases that reside in one or more physical devices and in one or more physical locations. The database may store a plurality of types of data and/or files and associated data or file descriptions, administrative information, or any other data.

Figure 2:
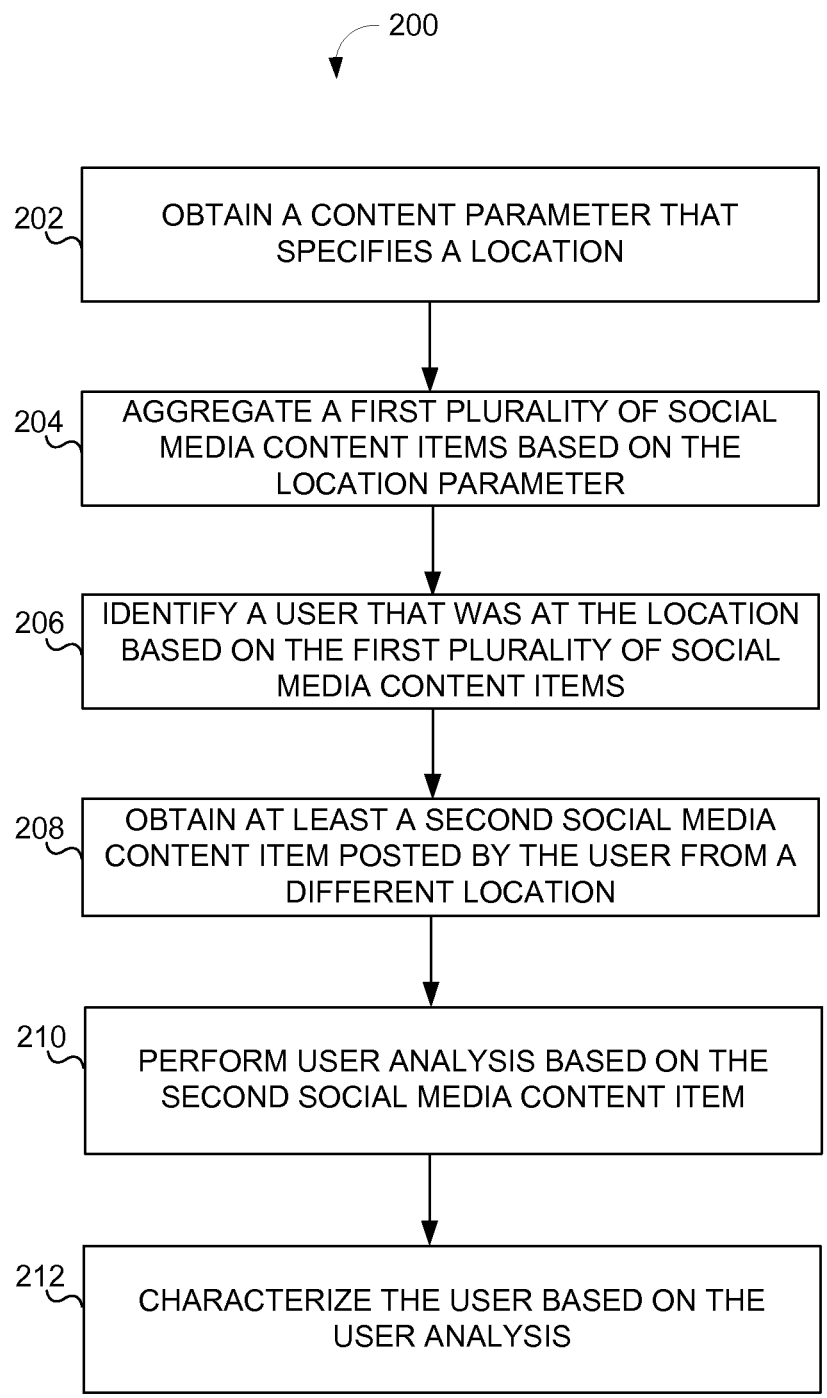
FIG. 2 depicts a process of identifying a user of interest based on a location of at least one of the user's social media posts and characterizing the user's behavior through other social media posts made by the user, according to an implementation of the invention.

FIG. 2 depicts a process 200 of identifying a user of interest based on a location of at least one of the user's social media posts and characterizing the user's behavior through other social media posts made by the user, according to an implementation of the invention. The various processing operations and/or data flows depicted in FIG. 2 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 202, a content parameter that specifies a location may be obtained. The content parameter specifying a location may be used to obtain social media content items relevant to the location (e.g., social media content items posted from the location or referring to the location). The content parameter may be used to identify users who posted the social media content items from the location. For example, a retailer may provide a content parameter that specifies one or more locations that correspond to its retail locations. In this manner, the retailer may identify its customers that post from its retail locations. Other content parameters may be obtained as well. The retailer, for instance, may provide other content parameters to further filter in and/or out social media content items posted from its retail locations (e.g., to identify customers who post to a particular social media site, post particular content having certain keywords, and/or other criteria that may be used to filter in and/or out social media content items).

In an operation 204, a first plurality of social media content items may be obtained based on the content parameter(s). For example, process 200 may aggregate the social media content items from social media content providers and/or may retrieve the social media content items from a memory (which were previously aggregated from the social media content providers and then stored in the memory). The first plurality of social media content items represents social media posted by users that are relevant to the location specified by the content parameter. For example, the first plurality of social media content items may represent social media content items posted or otherwise created by users from the location. In a particular set of examples, the first plurality of social media content items may include a TWEET by a user posted from a retailer's location, a photograph taken of a food item taken at the retailer's location, and so on.

In an operation 206, a user who was at a location specified by a content parameter may be identified based on the social media content items. For example, because the social media content items are relevant to the location, process 200 may assume that the user was at the location by identifying users who posted the social media content items. Of course, operation 206 may identify more than one who posted at least one social media content item from the location and subsequent analysis on those users may be performed, as described herein.

In an operation 208, at least a second social media content item posted by the identified user may be obtained. The second social media content item may be relevant to a second location that is different from the location specified by the content parameter. Operation 208 may obtain other social media content items posted by the user in the past and/or in real-time as well.

In an operation 210, user analysis may be performed based on the second social media content item. The user analysis may include determining: a location behavior (e.g., a history of locations visited by the user, a pattern of locations visited, etc.) as described herein and illustrated with respect to FIG. 3, user interests based on content of the social media content item (e.g., keyword analysis, image recognition, etc.) as described herein and illustrated with respect to FIG. 4, whether and to what extent the user influences other users (e.g., causes other users to post content similar to the user's content, repost the user's content, visit locations visited or described by the user, etc.) as described herein and illustrated with respect to FIG. 5.

In an operation 212, a characteristic of the user may be determined based on the user analysis. For example, locations that the user visits (as determined from locations from which the user posts social media content items), a user interest (as determined from content of the social media content items as well as the locations visited), whether and to what extent the user influences others, and/or other user characteristic of the user may be determined.

Accordingly, once a user is identified as a user of interest (e.g., because the user posted a social media content item from a specified location), the social media activity and history of the user may be obtained and analyzed. In this manner, a retailer may identify its customers and then characterize the user based on user's social media content items.

Figure 3:
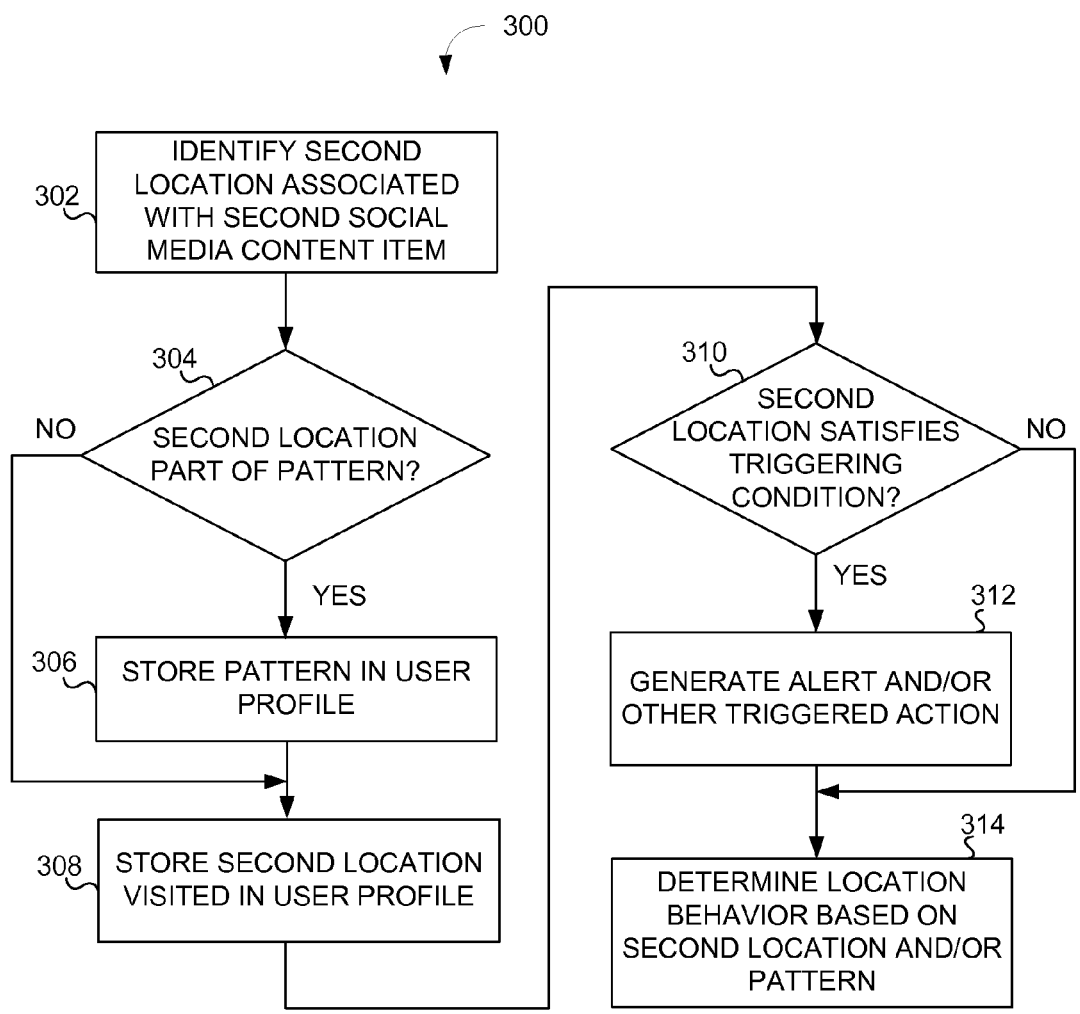
FIG. 3 depicts a process of determining a location behavior of a user of interest based on the user's social media posts, according to an implementation of the invention.

FIG. 3 depicts a process 300 of determining a location behavior of a user of interest based on the user's social media posts, according to an implementation of the invention. The various processing operations and/or data flows depicted in FIG. 3 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In operation 302, a second location associated with a second social media content item posted by a user of interest may be identified. The second location may be different from the location used to identify the user of interest.

Clustering Social Media Content Items

In operation 304, a determination of whether the second social media content item clusters with at least one other social media content item posted by the user of interest may be made. A cluster of social media content items may include a set of social media content items in which their associated locations are within a threshold distance and within a cluster boundary. The threshold distance may be predefined and/or defined by a margin of error associated with a location technique used to determine the location. The cluster boundary may be determined based on a generally centered location amongst a plurality of locations from which social media content items were posted/are relevant and a radius or other area-determining parameter. A cluster may be formed based on a predefined time window within which social media content items in the cluster have been posted or may simply include all social media content items posted by the user of interest.

For a given social media content item associated with a location (e.g., geo-location coordinates), a circle (or other shape) having a center based on the location and a radius based on the margin of error may be determined. A social media content items having a larger margin of error (e.g., less accurate) may be associated with a larger circle. Operation 304 may determine that two or more social media content items should be clustered if their circles intersect and do not exceed a cluster boundary. Conventional location clustering techniques may be used to handle social media content items posted by a user that are dispersed over large areas and/or to determine the boundaries of a given cluster. In this manner, one or more clusters of locations from which the user has posted social media content items may be determined.

Discovering Routes Taken or New Locations Visited by the User

In operation 306, responsive to a determination that the second social media content item does not cluster with at least one other social media content item, analysis on the single location associated with the second social media content item may be performed. For example, if the second social media content item does not cluster with any other social media content item posted by the user of interest, then the second social media content item may have been posted by the user while en route to a location, while visiting a location for the first time (at least a location from which the user has posted social media for the first time), or may be an outlier.

If speed or acceleration information associated with the second social media content item is available and indicates that the second social media content item was posted while the user was in motion, then a determination may be made that the second social media content item was posted en route to a location.

In any event, operation 306 may determine whether the location is along a route between known locations frequented by the user (e.g., a home, office, favorite restaurant, etc.). Such determination may be made based on conventional mapping techniques that determine various routes between two or more locations and/or mass transit routes. If a given route (among the possible routes) including the location and one or more known locations of a user does not exceed a certain distance or travel time threshold, then the given route may be determined to have potentially been taken by the user. Otherwise, the given route may not be considered. For example, the user may have visited the location on the way to work from home or between other known locations of the user if the given route does not exceed a threshold distance. This is because operation 306 may assume that the user would not take a major detour (beyond a threshold limit) to visit the location while travelling to work from home, for example.

The determination may also be made based on a time that the second social media content item was posted. For example, if the time corresponds to a known commute window, then the social media content item may be determined to have been made during the commute.

If the second social media content item cannot be correlated to a route or other known locations, then the location from which the second social media content item was posted may be stored in a user profile for later analysis, as it may form the basis for a frequented location. For example, the user may have discovered a new favorite restaurant and posted the second social media content item from that location for the first time. The user may post subsequent social media content items during future visits to the new favorite restaurant, which may be clustered with the second social media content item.

In operation 308, responsive to a determination that the second social media content item clusters with at least one other social media content item, a determination of whether the number of social media content item in the cluster exceeds a threshold number to be considered a cluster.

Determining Favorite Locations and Patterns of Locations of a User

In operation 310, responsive to a determination that the number of social media content item in the cluster does not exceed a threshold number, multiple point analysis may be performed. If the number of social media content items in a given cluster do not exceed a threshold number, they may still indicate favorite routes/locations, a certain pattern, and/or other location behavior. For instance, a clustered set of social media content items may indicate a route, favorite location, a pattern of visiting a location, and/or other location behaviors of a user.

A cluster of social media content items may be determined to correspond to a route in a manner similar to single point analysis described above. However, a level of confidence in a route determined from multiple point analysis may be higher than a route determined from single point analysis due to the additional data points used in multiple point analysis.

Operation 310 may determine that a cluster of social media content items corresponds to a favorite location of the user. A favorite location may include one in which a user visits beyond a threshold number of times to be considered a favorite, but below a threshold number of times to be considered a primary location (discussed further below). By understanding favorite locations of a user, a retailer and others may understand interests of their customers.

By discovering the patterns of location, for instance, retailers or others may anticipate where a user may be at a given time and provide relevant information such as incentives before the user is at a given location. For example, operation 310 may identify patterns in which a user of interest usually visits a competing retailer's location every Friday based on social media content items posted by the user from the competing retailer's location on Fridays. On Thursday (or other time), the retailer may provide the user with an incentive to instead visit the retailer (alternatively, the retailer may determine that the user is/will be unresponsive to such incentives and therefore refrain from providing the user with an incentive on Thursdays).

Determining Primary Locations of a User Based on Clusters

In operation 312, responsive to a determination that the number of social media content item in the cluster exceeds a primary threshold number, the cluster may be determined to correspond to a primary location of the user. A primary location may include a location in which a user regularly spends a large portion of time. For example, and without limitation, a primary location may include a residence of the user, a workplace, and/or other location from which a number of social media content items have been posted exceeds a primary threshold number.

Primary locations may be used to determine potential routes that the user takes between two or more primary locations and/or favorite locations. In this manner, primary locations may be used to anchor possible location behaviors of users, as well as obtain demographic information of the users.

Generating Location-Based Alerts and a User Profile

In operation 314, a determination of whether an alert condition has been triggered based on the location. For example, a retailer or others may generate a geofence around its own retail locations, around competitor locations, and/or other locations such that an alert to the retailer is generated when the location corresponds to or is otherwise within the geofence.

In an operation 316, responsive to a determination that the alert condition has been triggered, a real-time alert and/or history report may be provided that indicates that the customer has entered or is within certain locations.

In an operation 318, a user profile may be generated or updated to include the characteristics of the user determined by the foregoing operations.

Figure 4:
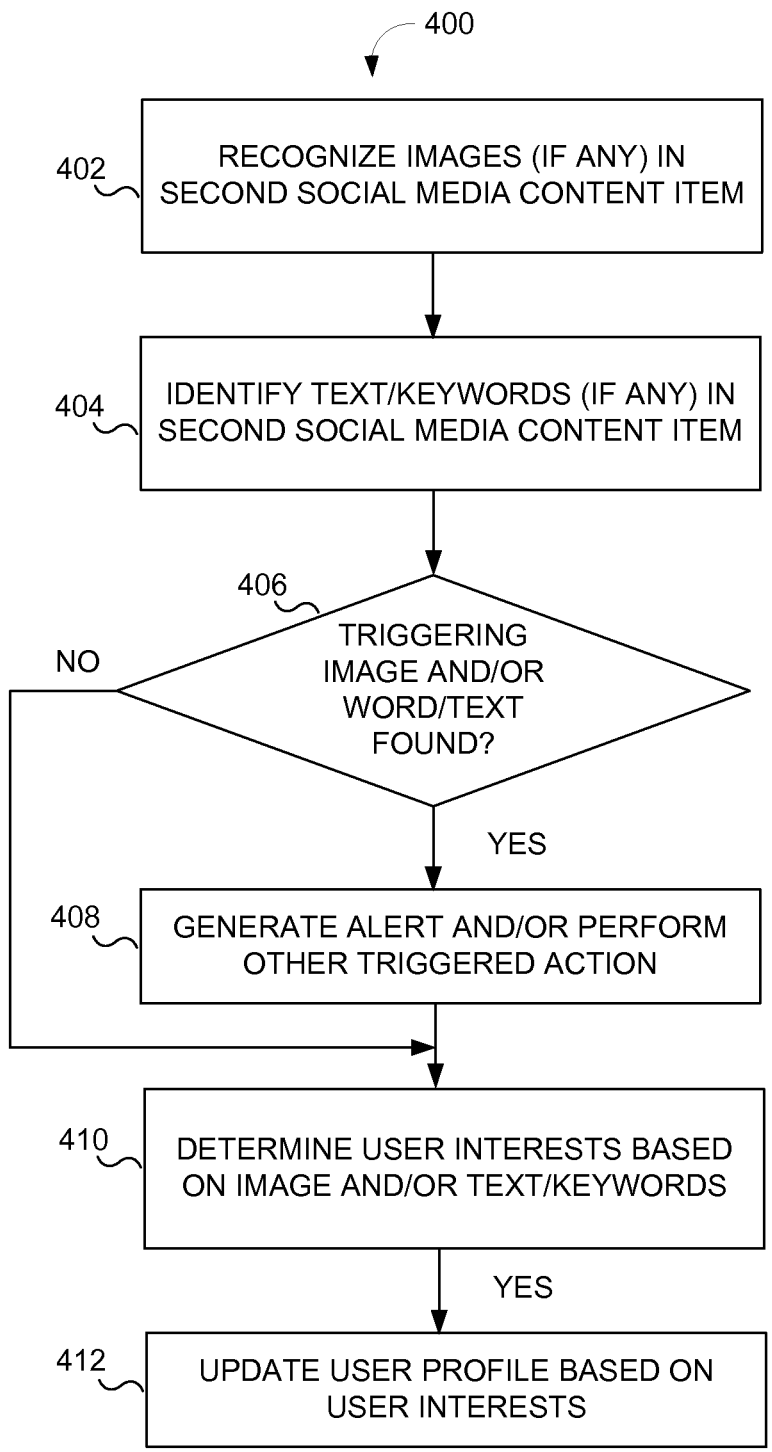
FIG. 4 depicts a process of determining user interests based on the content of a user's social media posts, according to an implementation of the invention.

FIG. 4 depicts a process 400 of determining user interests based on the content of a user's social media posts, according to an implementation of the invention. The various processing operations and/or data flows depicted in FIG. 4 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 402, any images in a second social media content item may be recognized using conventional image recognition techniques. For example, an image from the second social media content item may be compared against a database of known images.

In an implementation, a retailer or others may upload certain images (e.g., TRADEMARKS, logos, product images, etc.) for comparison to images from social media content items. The uploaded images may be associated with a known context such that the context of matching images may be determined. For instance, if a retailer posts an image of a competitor's logo and that logo is recognized in a customer's social media content item, then process 400 may determine that the customer posted subject matter related to the competitor (and therefore may have an interest in the competitor—or may disfavor the competitor depending on additional context such as negative words in an accompanying or associated post).

In an operation 404, any text or keywords in a second social media content item may be parsed. The text may be compared against a dictionary of known words (and their associated subject matter). Similar to uploaded images, a retailer or others may upload certain words or other text that are associated with a given subject matter or topic so that social media content items may be mapped to associated subject matter based on keywords or other text included. For instance, a retailer may upload a word (e.g., a product name) associated with its products or services. Upon determining that the word is included in the second social media content item, process 400 may recognize that the user has posted about the retailer's products or services.

In an operation 406, a determination of whether triggering content (e.g., an image or text) was found in the second social media content item may be made. Triggering content may include content that triggers an action such as an alert to a retailer or others. For example, a retailer may be alerted if certain words or images are found in social media content items posted by its customers.

In an operation 408, responsive to a determination that triggering content was found, an alert may be communicated and/or other triggered action may be taken.

In an operation 410, a user interest may be determined based on the recognized images, text, and/or other content. In an operation 412, a user profile may be updated based on the user interests.

Figure 5:
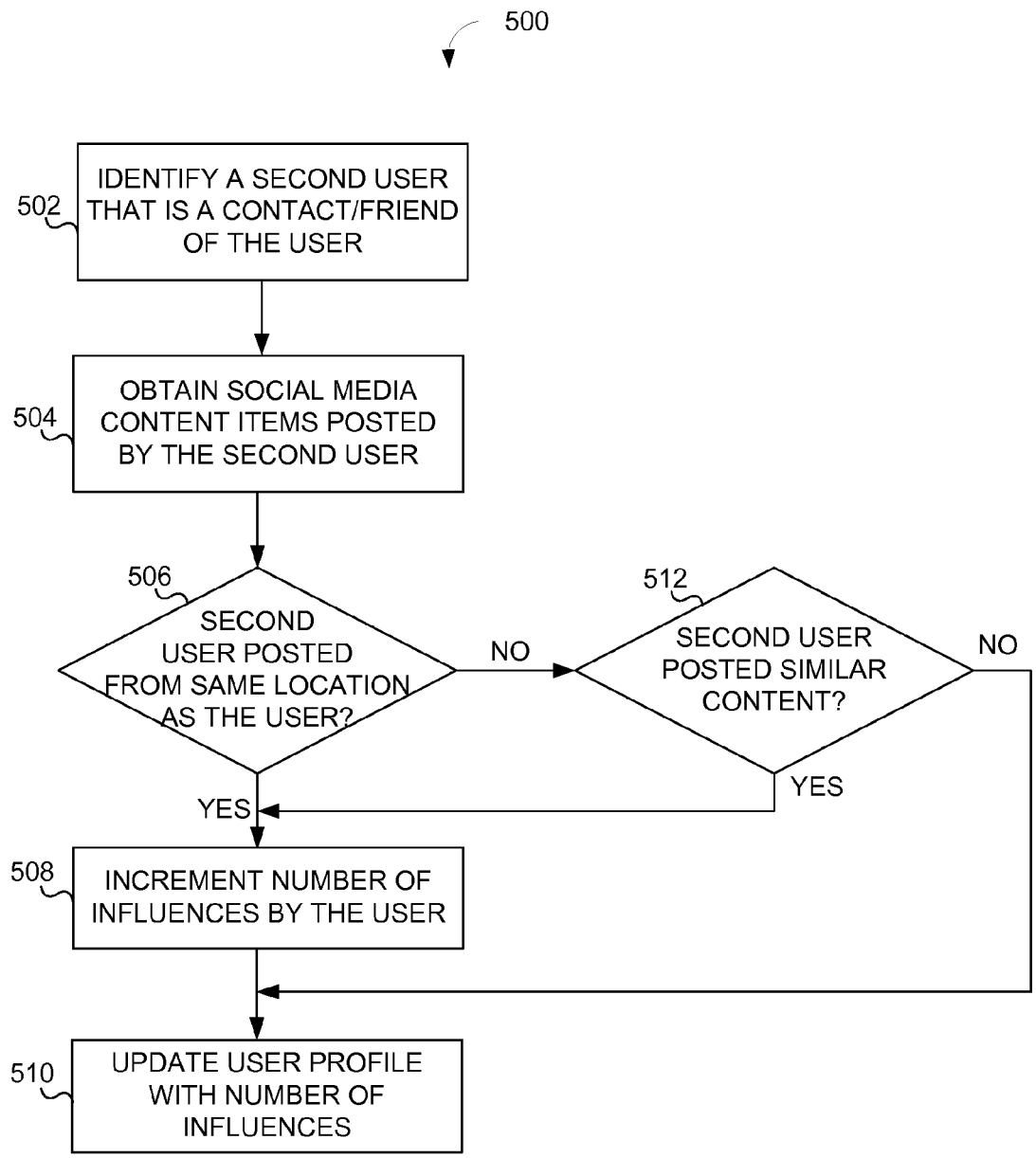
FIG. 5 depicts a process of determining whether and to what extent a user of interest influences or has the potential to influence other users based on the user's social media posts, according to an implementation of the invention.

FIG. 5 depicts a process 500 of determining whether and to what extent a user of interest influences or has the potential to influence other users based on the user's social media posts, according to an implementation of the invention. The various processing operations and/or data flows depicted in FIG. 5 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 502, a second user that is a contact of a user of interest may be identified. A contact may include a user who is associated with another user, as determined based on their respective social media accounts (e.g., a "friend" or "follower" of another user), an entry in a contacts folder of a user's device, and/or other known association between users.

In an operation 504, social media content items posted by the second user may be obtained. For example, in operation 504, process 500 may aggregate social media content items posted by the second user from one or more social media providers.

In an operation 506, a determination of whether the second user posted a second social media content item from a location that is the same as or similar to a location from which the user of interest posted a first social media content item may be made. The determination may use clustering techniques described herein to determine whether the locations are sufficiently close to one another to determine that they are the same or similar. Furthermore, the determination may include determining that the second social media content item was posted after the first social media content item.

In an operation 508, responsive to a determination that the second user posted a second social media content item from a location that is the same as or similar to the location from which the user of interest posted the first social media content item, a number of influences by the user of interest may be incremented. For instance, the user of interest's first social media content item may have influenced the second user to also visit the location and/or post the second social media content item in response to the first social media content item, demonstrating that the user of interest had an influence over the second user.

In an operation 512, responsive to a determination that the second user did not post a second social media content item from a location that is the same as or similar to a location from which the user of interest posted the first social media content item, a determination of whether the second user posted a second social media content having content similar to the first social media content item may be made. Content between the first social media content item and the second social media content item may be similar if they share one or more common properties. A common property may include a same or similar (e.g., common misspelling, synonyms, etc.) keyword, a same topic or subject matter, a same or similar (e.g., resized, cropped, etc.) image, an identical copy or link to an original post (e.g., a "RETWEET"), and/or other common properties.

If the second user posted a second social media content having content similar to the first social media content item, then processing may proceed to operation 508, where a number of influences by the user of interest may be incremented.

In operation 510, a user profile of the user of interest may be generated or updated based on the number of influences or their pre-determined influence score based on followers, retweets, comments, etc. Alternatively or additionally, the user profile may be generated or updated based on a number of distinct other users that the user of interest influenced.

Figure 6:
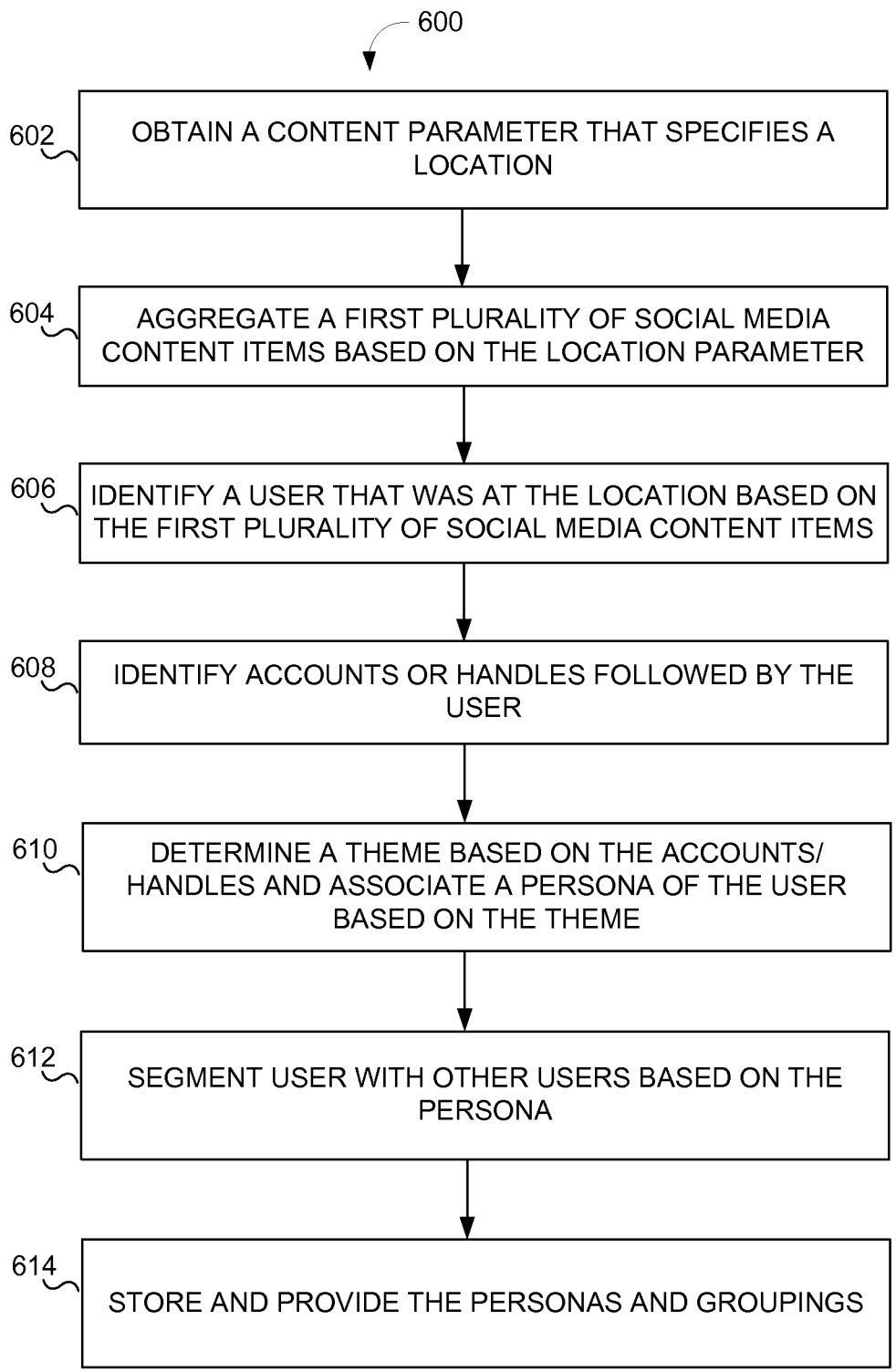
FIG. 6 depicts a process of determining a persona of a user and grouping the persona into themes to characterize users based on social media, according to an implementation of the invention.

FIG. 6 depicts a process 600 of determining a persona of a user and grouping the persona into themes to characterize users based on social media, according to an implementation of the invention.

In an operation 602, a content parameter that specifies a location may be obtained. Operation 602 may proceed in a manner similar to operation 202 illustrated in FIG. 2.

In an operation 604, a first plurality of social media content items may be obtained based on the content parameter(s). Operation 604 may proceed in a manner similar to operation 204 illustrated in FIG. 2.

In an operation 606, a user who was at a location specified by a content parameter may be identified based on the social media content items. Operation 606 may proceed in a manner similar to operation 206 illustrated in FIG. 2.

In an operation 608, accounts or handles followed by the user may be identified. For instance, the user may be determined to be following @NASCAR, @Goodyear, @INDY500, and @TonyStewart accounts/handles.

In an operation 610, a theme may be identified based on the accounts/handles. For instance, in the foregoing example, a "NASCAR" theme may be identified based on the accounts/handles followed by the user. In an implementation, a given theme may be predefined by the system. For instance, the system may use predefined themes and their associated handles/accounts. In this instance, the system may store various handles/accounts with an associated theme, which may be predetermined. In a particular example, the social media accounts/handles of various pop music artists may be culled into a "pop music" theme (and likewise for other types of music). Likewise, various retailers may be culled into categories of retailers. In other examples, different handles/accounts associated with similar subject matter may be culled into a theme (e.g., @Goodyear and @NASCAR may be culled into a NASCAR or car racing theme. Other types of predefined themes may be used as well. In some instances, the themes may be hierarchically arranged. For instance, a general "music" theme may have sub-themes corresponding to different genres of music.

Regardless of how the themes are generated, a persona of the user may be determined based on the determined theme. For instance, the user may be determined to have a "NASCAR fan" persona based on the theme. In instances where the themes are arranged hierarchically, the user may be given a persona "music lover" as well as (or instead) defined as a "pop music lover."

In an operation 612, the user may be segmented (e.g., grouped) with other users based on the determined persona. For instance, "NASCAR fans" may be grouped with one another. "Music lovers" may be grouped with other music lovers, and so on. In hierarchical instances, a given user may be grouped with all "music lovers" (which would include users who love different types of music) as well as "pop music lovers" (which would include user who love pop music in particular).

In an operation 614, the personas and segments of users may be stored and provided. For example, marketers may use the personas and segments to describe and reach their audience in ways not previously conceived. For example, through this analysis, the promoters of the Super Bowl (e.g., the NFL and NBC or other broadcast network) may determine that the audience at the game is comprised of more NASCAR fans than they would have imagined. This may in turn represent an opportunity to cross-promote the Super Bowl with NASCAR events.

Referring to FIGS. 3, 4, 5, and 6, processes 300, 400, 500, and 600 may be used to analyze social media content items posted by a user of interest to characterize the user of interest. For example, when a user of interest is identified based on a first social media content item that is posted by that user from a specified location (e.g., a retail location), processes 300, 400, 500, 600, and/or other user analysis may be performed on other social media content items posted by the user, whether the other items were posted before or after the first social media content item.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer implemented method of identifying social media influencers, the method being implemented in a computer system having one or more physical processors programmed with computer program instructions that, when executed by the one or more physical processors, program the computer system to perform the method, the method comprising:

obtaining, by the computer system, a location parameter that specifies one or more geographically definable locations to be monitored;

aggregating, by the computer system, a plurality of social media content items from one or more social media content providers based on the location parameter, wherein the plurality of social media content items were each posted from a given one of the one or more geographically definable locations, and wherein the plurality of social media content items include at least a first social media content item posted from a first geographically definable location;

identifying, by the computer system, a first user that posted the first social media content item;

identifying, by the computer system, a second user associated with the first user;

obtaining, by the computer system, a second social media content item posted by the second user;

determining, by the computer system, a second location associated with the second social media content item;

determining, by the computer system, that the second location corresponds to the one or more geographically definable locations;

determining, by the computer system, that the second user visited at least one of the one or more geographically definable locations based on the correspondence between the second location and the one or more geographically definable locations;

determining, by the computer system, that the first user caused the second user to visit the at least one of the one or more geographically definable locations;

determining, by the computer system, that the second social media content item was posted in response to the first social media content item; and determining, by the computer system, that the first user is an influential user based on the determination that the first user caused the second user to visit the at least one of the one or more geographically definable locations and the determination that the second social media content item was posted in response to the first social media content item.

2. The method of claim 1, the method further comprising:

determining, by the computer system, that the first user posted a subsequent social media content item from the one or more geographically definable locations after the first social media content item; and providing, by the computer system, an alert that indicates that the first user has posted the subsequent social media content item from the one or more geographically definable locations.

3. The method of claim 1, wherein determining that the second social media content item was posted in response to the first social media content item comprises:

determining, by the computer system, first content of the first social media content item;

determining, by the computer system, second content of the second social media content item; and determining, by the computer system, that the first content and the second content share the same or similar subject matter.

4. The method of claim 1, wherein identifying the second user comprises determining that the second user is a social media contact of the first user.

5. The method of claim 1, the method further comprising:

determining, by the computer system, a number of social media content items posted by one or more other users that were influenced by the first user; and determining, by the computer system, a level of influence of the first user based on determined number.

6. The method of claim 5, the method further comprising:

providing, by the computer system, one or more relevant messages to the first user based on the level of influence of the first user.

7. The method of claim 1, the method further comprising:

identifying, by the computer system, one or more other users that were influenced by the first user; and providing, by the computer system, one or more relevant messages to the one or more other users.

8. The method of claim 1, wherein determining that the second social media content item was posted in response to the first social media content item comprises:

determining, by the computer system, that the second social media content item was posted before or after the first social media content item.

9. The method of claim 1, the method further comprising:

determining, by the computer system, a number of followers, a social media influencer score, or a number of re-posts associated with the first user, wherein determining that the first user is an influential user is further based on the number of followers, the social media influencer score, or the number of re-posts.

10. The method of claim 1, wherein determining that the second social media content item was posted in response to the first social media content item comprises:

determining that the second social media content item was posted from the first geographically definable location after the first social media content item was posted from the first geographically definable location.

11. A system of identifying influential users, the system comprising:

a computer system comprising one or more physical processors programmed with computer program instructions that, when executed by the one or more physical processors, program the computer system to:

obtain a location parameter that specifies one or more geographically definable locations to be monitored;

aggregate a plurality of social media content items from one or more social media content providers based on the location parameter, wherein the plurality of social media content items were each posted a given one of from the one or more geographically definable locations, and wherein the plurality of social media content items include at least a first social media content item posted from a first geographically definable location;

identify a first user that posted the first social media content item;

identify a second user associated with the first user;

obtain a second social media content item posted by the second user;

determine a second location associated with the second social media content item;

determine that the second location corresponds to the one or more geographically definable locations;

determine that the second user visited at least one of the one or more geographically definable locations based on the correspondence between the second location and the one or more geographically definable locations;

determine that the first user caused the second user to visit the at least one of the one or more geographically definable locations;

determine that the second social media content item was posted in response to the first social media content item; and determine that the first user is an influential user based on the determination that the first user caused the second user to visit the at least one of the one or more geographically definable locations and the determination that the second social media content item was posted in response to the first social media content item.

12. The system of claim 11, wherein the computer system is further programmed to:

determine that the first user posted a subsequent social media content item from the one or more geographically definable locations after the first social media content item; and provide an alert that indicates that the first user has posted the subsequent social media content item from the one or more geographically definable locations.

13. The system of claim 11, wherein to determine that the second social media content item was posted in response to the first social media content item, the computer system is further programmed to:

determine first content of the first social media content item;

determine second content of the second social media content item; and determine that the first content and the second content share the same or similar subject matter.

14. The system of claim 11, wherein identifying the second user comprises determining that the second user is a social media contact of the first user.

15. The system of claim 11, wherein the computer system is further programmed to:
determine a number of social media content items posted by one or more other users that were influenced by the first user; and
determine a level of influence of the first user based on determined number.

16. The system of claim 15, wherein the computer system is further programmed to:
provide one or more relevant messages to the first user based on the level of influence of the first user.

17. The system of claim 11, wherein the computer system is further programmed to:
identify one or more other users that were influenced by the first user; and
provide one or more relevant messages to the one or more other users.

18. The system of claim 11, wherein to determine that the second social media content item was posted in response to the first social media content item, the computer system is programmed to:
determine that the second social media content item was posted before or after the first social media content item.

19. The system of claim 11, wherein the computer system is further programmed to:
determine a number of followers, a social media influencer score, or a number of re-posts associated with the first user; and
determine that the first user is an influential user based on the number.

20. The system of claim 11, wherein to determine that the second social media content item was posted in response to the first social media content item, the computer system is further programmed to:
determine that the second social media content item was posted from the first geographically definable location after the first social media content item was posted from the first geographically definable location.

21. A system of identifying users of interest based on social media posts made by the users from one or more locations and re-entry into the one or more locations by the users, the system comprising:
a computer system comprising one or more physical processors programmed with computer program instructions that, when executed by the one or more physical processors, program the computer system to:
obtain a location parameter that specifies one or more geographically definable locations to be monitored;
aggregate a first plurality of social media content items from one or more social media content providers based on the location parameter, wherein the plurality of social media content items were each posted from the one or more geographically definable locations and include at least a first social media content item;
identify a first user that posted the first social media content item;
identify a second user associated with the first user;
obtain a second social media content item posted by the second user;
determine a second location associated with the second social media content item;
determine that the second location corresponds to the one or more geographically definable locations;
determine that the second user visited at least one of the one or more geographically definable locations based on the correspondence between the second location and the one or more geographically definable locations;
determine that the first user caused the second user to visit the at least one of the one or more geographically definable locations;
determine that the second social media content item was posted in response to the first social media content item;
determine that the first user is an influential user based on the determination that the first user caused the second user to visit the at least one of the one or more geographically definable locations and the determination that the second social media content item was posted in response to the first social media content item;
aggregate a second plurality of social media content items from one or more social media content providers based on the location parameter, wherein the second plurality of social media content items were each posted from the one or more geographically definable locations and include at least a third social media content item;
determine that the first user posted the third social media content item; and
generate and provide an alert that indicates that the first user posted the third social media content item.

22. The system of claim 21, wherein the computer system is further programmed to:
determine a level of influence of the first user; and
provide a relevant message to the first user based on the level of influence.

* * * * *